March 1, 1966 R. A. A. JEANNIN 3,238,058
PROCESS AND DEVICE FOR ADJUSTING THE THICKNESS OF PASTE LAYERS
AND USE OF SAME FOR MANUFACTURING SINTERED ELECTRODES
Filed Sept. 26, 1961 3 Sheets-Sheet 1
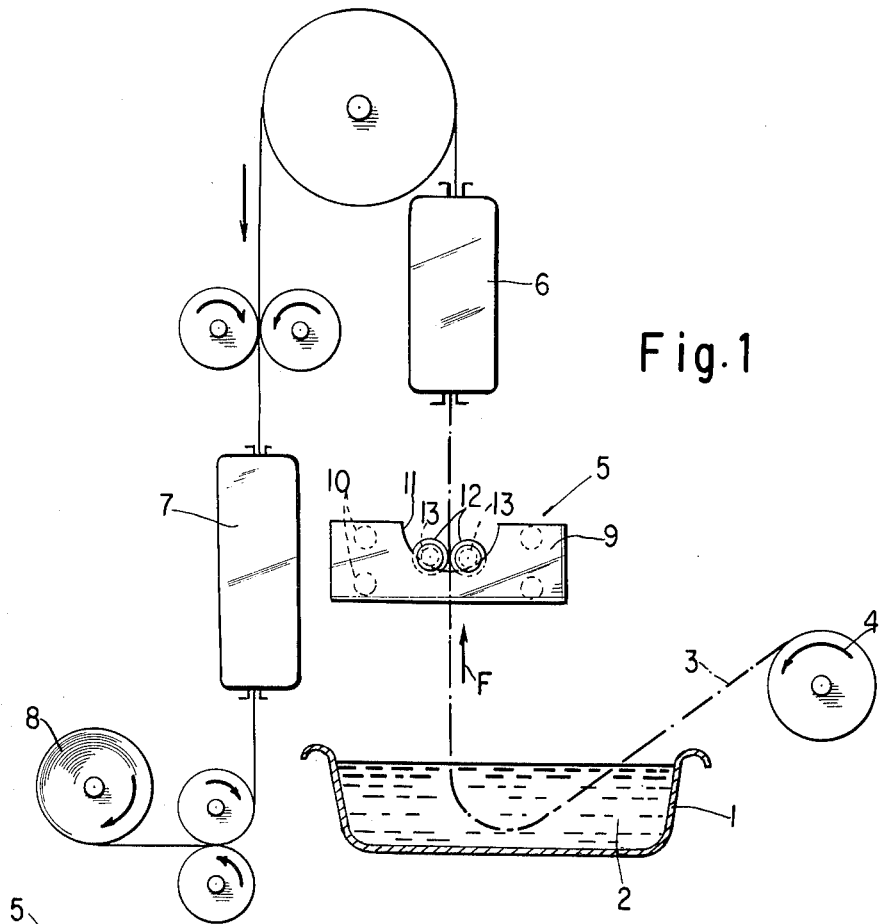
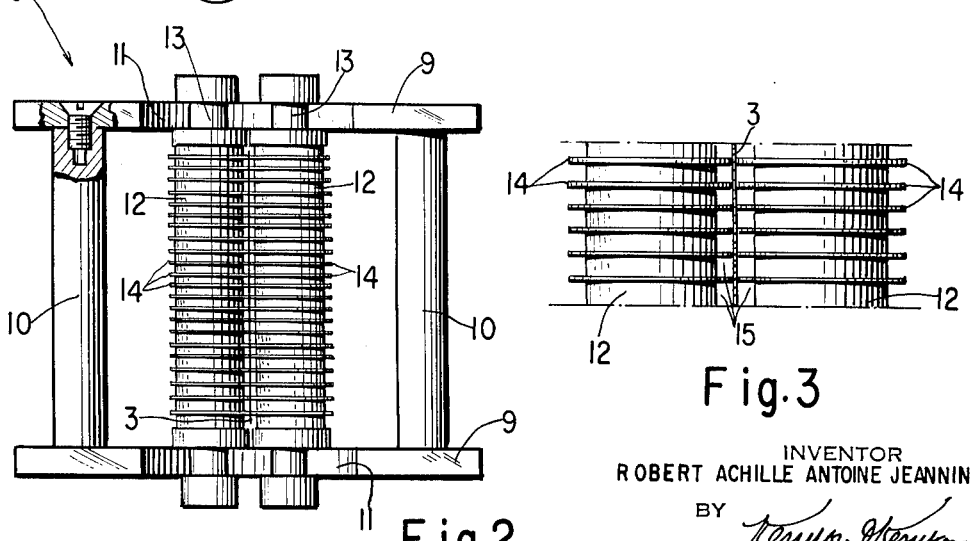
INVENTOR
ROBERT ACHILLE ANTOINE JEANNIN
BY
ATTORNEYS

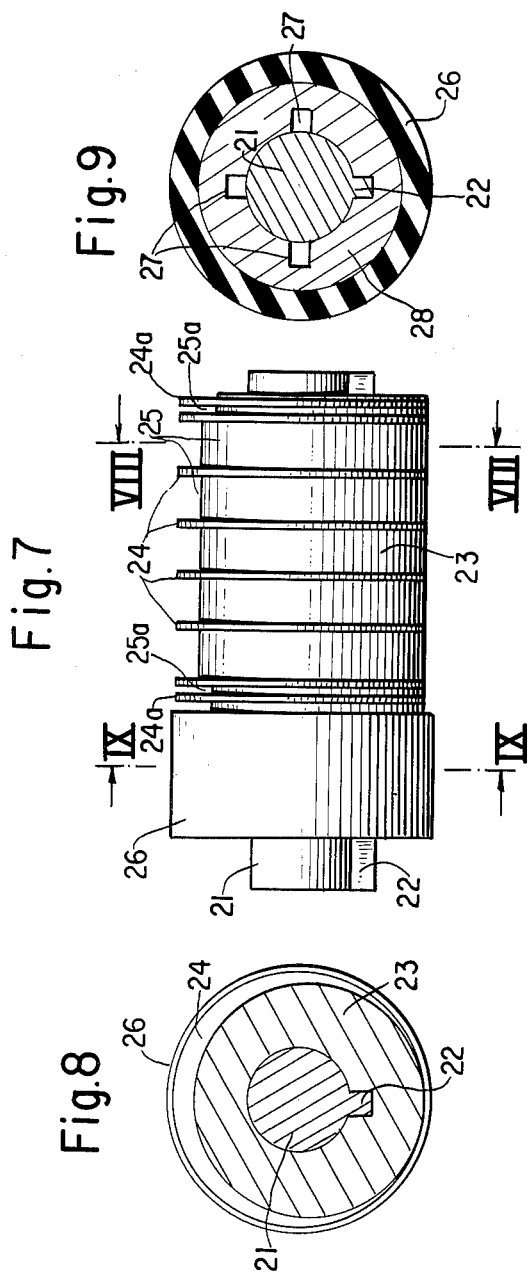

3,238,058
PROCESS AND DEVICE FOR ADJUSTING THE THICKNESS OF PASTE LAYERS AND USE OF SAME FOR MANUFACTURING SINTERED ELECTRODES
Robert Achille Antoine Jeannin, Paris, France, assignor to Societe des Accumulateurs Fixes et de Traction (Societe Anonyme), Romainville, France, a company of France
Filed Sept. 26, 1961, Ser. No. 140,796
Claims priority, application France, Sept. 27, 1960, 839,631; Aug. 4, 1961, 870,090
11 Claims. (Cl. 117—102)

One of the continuous manufacturing processes of thin sintered electrodes consists in coating a strip of nickel-plated metal or nickel sheet either perforated or not, having a thickness of between 0.05 and 0.10 mm., or a metal gauze of the same thickness having a mesh size in the millimeter range, with a suspension of nickel powder in water, said nickel powder being preferably obtained from nickel carbonyl, a small amount of adhesive being added to the water. The said adhesive is intended, on the one hand, for maintaining the powder particles in suspension in water, and on the other hand, for making the dried layer adherent, before sintering said powder.

The operation is made by passing the metal strip through the nickel powder suspension to coat both sides of the strip with paste, then doctoring the thickness of the paste layer after the strip comes out of the suspension by passing the strip through a rectangular slot the width of which can be precisely controlled.

This way of operating has some drawbacks.

It is difficult to center accurately the metal strip in the slot and an error in centering gives rise to an irregularity in the thickness of the paste layer on both sides. It is very important that the sintered mass intended for containing the electrode active material in its pores, be evenly distributed on both sides of the metal sheet or gauze support and that each sintered layer possess a uniform distribution of pores. The above described shifting of the metal sheet support during the coating process, with consequent uneven distribution of sintered mass, may result in certain undesirable features, such as:

(1) Uneven pore distribution in the sintered layers on both sides of the metal sheet, (2) Faulty distribution of the electrical current in the electrode during use in a cell.

Moreover, if the thin metal strip, as is often the case in practice, is slightly distorted, or if its surface is uneven, the metal may rub against one side of the slot, causing a "wiping off" of the paste so that the naked support metal appears at the surface of the finished plate. This defect is very serious for it occasions, during the subsequent operations for impregnating the plates, cracks and even scaling off of the sintered layer in these areas, therefor results in an increase in manufacturing costs due to the high price of the raw materials used for this kind of thin plate.

The present invention remedies these drawbacks and gives a simple and precise way of obtaining coating layers of a uniform preselected thickness. It gives also a way of manufacturing a sintered electrode support of a very small thickness, such as 0.3 mm., which was not possible before.

The object of this invention is to provide a device for establishing the thickness of paste layers on both sides of a continuous metal strip comprising two cylinders with their axes parallel to the metal strip plane, placed one on each side of the said metal strip and biased towards the said strip by any suitable means, said cylinders presenting thin projecting ribs which come to press against the faces of the said strip so that a clearance having a constant depth is provided between the strip and surfaces of the cylinders. The cylinders will thus be able to follow every local distortion of the strip, while maintaining on each side of said strip a clearance of constant depth, thus making unnecessary the centering operation which is necessary in prior processes.

When the strip, coated on both sides with an excess of paste material, is drawn between the two cylinders, the thin ribs of the latter easily penetrate the paste material to come into contact with the surface of the strip, so that there only remains for the paste the clearance between the cylinders and the strip. Thus the excess of paste, the thickness of which exceeds the depth of the ribs, will be removed.

Therefore it is only necessary to choose a particular depth of the ribs to obtain layers having an accurately determined and uniform thickness. For production where the thickness of the layers is always the same, cylinders having ribs of a constant depth can be used. However, if adjustability of the thickness of the layers should be desired from time to time, cylinders can be provided having circular ribs disposed eccentrically relative to the axis of the cylinder, thereby providing a depth varying according to the eccentricity. In this case a particular angular position of the cylinders relative to the strip must be maintained according to the required thickness of the layer.

The force urging the cylinders towards the strip may be caused by their own weight, if the cylinders are heavy enough to squeeze the strip between themselves with the required pressure. Alternately or jointly, springs or any other suitable means may be used.

In a particular embodiment of the invention the cylinders come to rest freely at their ends on a curved cradle the concavity of which is upwards. With such a profile the cylinders come to rest at the lowest possible position thus compressing the strip between them.

In another embodiment, the cylinders could be mounted on articulated levers or arms disposed in such a way that the stable position of the cylinders corresponds to the point at which the pressing of the cylinders against the strip occurs.

Still another embodiment of the present invention provides means for obtaining on the support strip coated with the paste some uncoated areas of predetermined width and location on the strip. In storage battery production such uncoated areas are desirable for building up plate heads and for cutting up the plates, in order to avoid scaling or flaking off of the nickel powder layer filled with active material.

The uncoated areas are obtained according to this embodiment, by a wiping action on the suport strip on a determined width. This wiping off of the paste is obtained at the same time as the adjustment of the paste thickness by a special construction of the flanged or ribbed cylinder. To this effect the cylinder has a cylindrical smooth i.e. unribbed surface arranged so that it comes in direct contact with the support strip, thus removing the paste which occurs at such area. Of course, as in the other embodiment of the invention, two similar cylinders are used one on each side of the support strip, pressing against the opposite faces of the said strip.

According to this embodiment of the invention the ribbed cylinders include cylindrical blocks or wiping members of the desired width, made for example of turned metal, and coated with layers or sleeves of semi-soft rubber, about 5 mm. thick for instance, with a hardness preferably between 40 to 60° Shore. The composition of the rubber is selected from among the wear proof ones, for instance neoprene or a mixture based on neoprene. The diameter of the wiping out members, measured on the surface of the rubber is slightly greater than that of the ribs by a few tenths of a millimeter and the wiping members and the ribs are coaxially mounted.

Other objects and features of the invention will become apparent in the following description and claims, and in the drawings in which:

FIG. 1 is a schematic diagram showing the sintering process according to the present invention;

FIG. 2 is a plan view of a device according to the present invention;

FIG. 3 is an enlarged fragmentary view of the device shown in FIG. 1;

FIG. 7 is an enlarged side elevation of another embodiment for thickness adjustment and side wiping;

FIGS. 8 and 9 are sectional views taken respectively along lines VIII—VIII and IX—IX of FIGURE 7;

FIG. 10 shows a localized defect which may be produced on the edges of the coated strip when the grooves between the ribs have all the same width from one end to the other of the coating cylinders; and FIG. 11 is a similar view showing the result obtained by modifying the spacing of the ribs.

Figure 4:
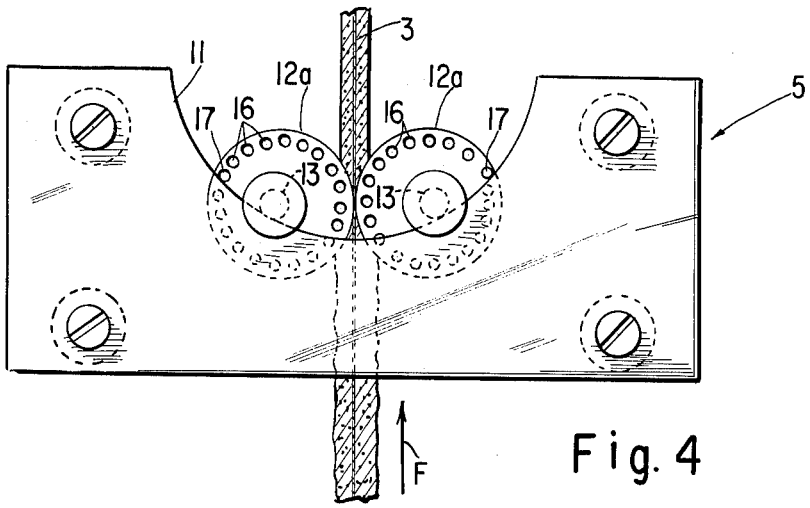
FIG. 4 is an end elevation of another embodiment.

Referring now to the drawings, the plant shown in FIG. 1 comprises a tank 1 containing the coating or paste material 2, the strip 3 coming from a spool 4, and the strip being immersed in the tank, then passing out of the tank at which point it is coated on both sides with adhering paste material layers of too great a thickness. The strip thus coated then passes through a device 5 for adjusting this thickness to a uniform value, then enters a drying oven 6, then a sintering oven 7, and lastly is rolled on to a receiving spool 8.

The device 5 for adjusting the thickness comprises a cradle made of two end-plates 9—9 opposite each other which are linked by crosspieces 10. The end-pieces are shaped so that their upper profile has a semi-circular part 11 turned upwards (see also FIG. 2).

Two cylinders 12—12 are provided at their ends with axial extensions or shafts 13, and are disposed on the cradle, said shafts being supported by the curved surface 11 of the plates 9. These cylinders are provided with a series of thin circular shaped ribs or fins 14 having a constant depth, situated in planes perpendicular to their axes, said axes being perpendicular to the direction F in which moves the strip 3 passing between the cylinders 12 (see FIG. 3).

The device which has been described operates in the following way:

Due to their own weights, the cylinders 12 get to the lowest part of the semi-circular slope 11 and press, by means of the edge of the ribs 14, each of the faces of the metal strip 3, the ribs going easily through the paste mass adhering to the said strip. Thus a clearance 15 is provided between the opposite faces of the strip 3 and the surface of the cylinders 12, said clearance having a constant depth which is the same as the depth of the ribs 14. If identical cylinders are employed, the clearance 15 will always be the same on each side of the strip 3, which means that said strip will be automatically and constantly centered between the cylinders 12 which follow the said strip in any lateral shifting which may occur. It will be noted that if an obstacle or protuberance occurs at any point on the strip, the cylinders will part to let it go through without causing a tearing of the strip, then will return to their normal position as soon as the obstacle has passed.

The said ribbed cylinders 12 are effective in removing any excess of thickness in the paste mass and in making uniform the paste layer to a thickness corresponding to the depth of the ribs 14.

It will be noted that at the end of the adjusting device 5, the paste layers adhering to the strip 3 reveal no trace of ribs 14, the paste mass closing in upon itself as soon as the ribs are passed.

Figure 5:
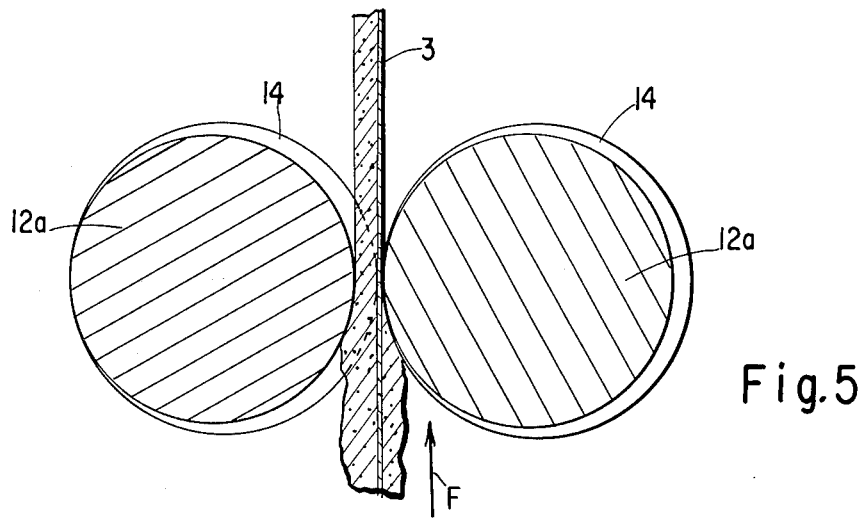
FIGS. 5 and 6 are enlarged diagrammatic sectional views of part of the device in cross-section, showing the way of adjusting the depth of the ribs.
Figure 6:
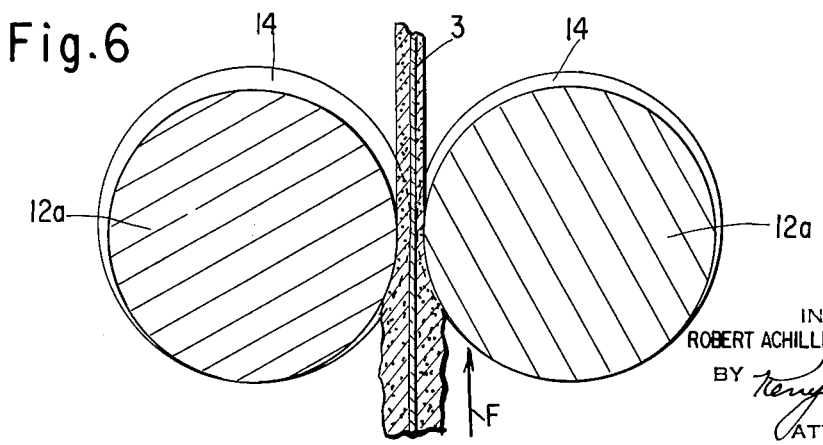

If it is desired to be able to adjust the depth of the clearance 15 and as a consequenct the thickness of the coating layers, the embodiment shown in FIG. 4 may be used. In the latter embodiment the cylinders are formed in such a way that the periphery of the ribs and the surface of the cylinders are eccentric, as is shown in FIGS. 5 and 6. By varying the angular position of the cylinders 12a, the clearance between the cylindrical surface and the strip 3 may be adjusted from a substantiallp zero or minimum value to a maximum value, the angular difference in the two extreme positions being 180°.

The angular position of the cylinders 12a and therefore the thickness of the layer, may be accurately determined by providing in one of the end faces of the cylinders, small notches 16 uniformly distributed in a circle and by inserting in one of them a removable pin 17 or similar projecting part, which abuts on the semi-circular slope 11.

It is thus possible, not only to obtain any desired thickness for the layers situated on each side of the strip 3 as shown in FIG. 6 by symmetrically adjusting the cylinders 12a, but to obtain unequal thicknesses for the two layers and even the total removal of one of them as shown in FIG. 5.

Instead of cylinders resting freely on cradles, the cylinders could be mounted on articulate arms or levers (not shown) so that they would press, due to their own weight, against the strip 3. It is not compulsory to use cylinders, and members which do not have surfaces of revolution may be used, such as small tooth combs and the like.

In the embodiment of FIGS. 7 to 9 inclusive, 21 is an assembling mandrel provided with a longitudinal key 22 which has a square cross-section and on which is slipped a movable part of coating cylinder 23 having a bore along which is slotted a keying groove having the same configuration as key 22. The coating cylinder 23 is thus linked with mandrel 21.

The cylinder has circular ribs 24, about 0.5 mm. thick and spaced from each other from about 2 to about 3 mm., eccentrically mounted relative to the axis of cylinder 23 and tangent to its surface along one generatrix; they define grooves 25 the depth of which vary between a maximum value from about 2 to about 4 mm. (at the upper part of FIGS. 7 and 8) and a zero or minimum value (at the lower part of the said figures) which therefore corresponds to a minimum thickness or absence of coating.

It will be noted that the keying groove of cylinder 23 is directed towards the side of zero or minimum coating.

According to a technical characteristic of the present invention, the end ribs 24a are at a closer relative spacing than the intermediary ones 24 (about half or a third of the normal spacing) whereas the depth of the end grooves 25a is greater than that of intermediary grooves 25, as seen in FIG. 7.

It sometimes occurs that the layer formed by equally spaced ribs has a flange or bead slightly shrunk back as shown on FIG. 10 where A is the support strip, C the paste layer and B the said flange or bead. By utilizing viscosity and capillarity phenomena in the paste between narrower and deeper end grooves the applicant has succeeded in completely removing this edge bead defect and in obtaining an even coating layer ending at the edge in a preferred curve D which does not project outwardly and the sectional profile of which is shown on FIG. 11.

According to another technical characteristic of the present invention, a wiping member is also slipped on mandrel 21, on the extension of cylinder 23, said wiping member being coaxial to the mandrel and comprising an annular coating or sleeve, made of pure neoprene or of another elastomer having good wear resistance, said coating being placed on a cylindrical block member 28 in the bore of which are slotted four keying grooves 27, making angles of 90° each with the adjacent one, which enables the slipping of the block on mandrel 21 according to four different angular positions. This arrangement has been adopted to take into account the progressive wear of the sleeve 26, so that the block may be used four times before being replaced.

The thickness of sleeve 26 is of about 5 mm. and its outer diameter, after truing with a wheel, is larger by about 0.4 mm. than that of ribs 24–24a. Very satisfactory results have been obtained with a rubber, the Shore hardness of which is of about 50°. The coating is then soft enough to wipe off perfectly the paste layer on the non-perforated track of the strip which passes between the two blocks.

Due to the softness of the rubber and to its small overthickness, the metal ribs of the two opposite coating cylinders maintain actual contact with the metal strip, so that it is possible to achieve electrical contact between the cylinders and the strip. Such contact makes it possible to dry the coating layer by the Joule effect.

In the above example for simplification only one coating element and one wiping block have been shown. In practice, it will of course be possible to slip on the same mandrel, the usable length of which corresponds to the width of the coated strip, any number of the above described elements and thus to obtain all possible arrangements of coated and non-coated areas.

In the same way, instead of a coating element and a wiping block each made of one part, a piling up of discs having various thicknesses and suitable diameters could be used.

It is to be understood that certain changes and additions may be made to the embodiments which have been described herein by those skilled in the art without departing from the scope and of the spirit of the present invention.

What is claimed is:

1. The method of forming adherent coatings of paste material of selected uniform thickness on each face of a moving continuous strip comprising the steps of moving the strip through the paste material to apply it to both of the faces of the strip across its width simultaneously and in excess of all desired coating thicknesses on the strip, thereafter passing the paste material bearing strip outside of the paste material between a pair of gravitationally biased non-rotative cylindrical members resting on cradle means having an upwardly directed surface on which said members are freely moveable upon contact with said strip bearing spaced-apart thin sensing ribs, said ribs on one cylindrical member being in the same plane as the corresponding ribs on the other cylindrical member, and said ribs under action of the gravitational bias on said members, engaging and sensing the locations of the opposite faces of said paste material bearing strip through the paste material thereon at several points across the width of the strip on each face and gliding through the paste material that has been applied to the strip, and simultaneously removing from each face of said strip by said cylindrical members all of the applied paste material in excess of a selected thickness desired for such face as measured by said sensing ribs.

2. The process according to claim 1 in which one or more selected lateral portions of said strip are simultaneously wiped free of adhering suspension material by coming into continuous contact with one or more projecting wiper-surfaces attached to said cylinders.

3. The process according to claim 1 wherein the paste material comprises a nickel powder suspension in adhesive.

4. Apparatus for controlling the thickness of an adherent coating of paste material on a moving support strip comprising, in combination, a non-rotative pair of oppositely disposed elongated members, cradle means for supporting said members with gravitational biasing of said members toward one another, said cradle means having an upwardly directed surface on which said members are freely moveable upon contact with said support strip, said members adapted to receive said strip therebetween, each of said members having thereon a plurality of thin projections disposed outwardly of its surface at laterally-spaced positions and adapted for contact at all times under the action of said gravitational biasing with a respective side of said strip and the projections on one of said members being located in the same plane as the corresponding projections on the other of said members.

5. Apparatus for controlling the thickness of an adherent coating of paste material on a moving support strip comprising a non-rotative pair of oppositely disposed cylindrical members having their axes parallel to one another and adapted to receive said strip therebetween, cradle means having concave surfaces on which said cylindrical members are freely supported to permit gravitational biasing of said cylindrical members toward one another, each of said cylindrical members having a plurality of thin circular fin members concentrically disposed on said body portion at spaced axial positions and in planes perpendicular to the axis of said cylindrical member and with corresponding fin members on the respective cylindrical members lying in common planes, said fin members being adapted to contact at their peripheries at all times under the action of said gravitational biasing with a side of said strip whereby thickness measuring grooves are provided for said coating on such side.

6. Apparatus for controlling the thickness of an adherent coating of paste material on a moving support strip comprising a pair of oppositely disposed cylindrical members having their axes parallel to one another and adapted to receive said strip therebetween, cradle means for supporting said members with gravitational biasing of said cylindrical members toward one another, said cradle means having an upwardly directed surface on which said members are freely moveable upon contact with said support strip, each of said cylindrical members having a plurality of relatively thin circular fin members eccentrically disposed thereon at spaced axial positions and in planes perpendicular to the axis of such cylindrical member, said fin members being concentrically disposed relative to one another and being tangent at a point on their peripheries with the surface of said cylindrical member, each of said fin members on one of said cylindrical members being located in the same plane as the corresponding fin members on the other of said cylindrical members, and said fin members being adapted to contact at their peripheries at all times under the action of said gravitational biasing each with a side of said strip whereby thickness measuring grooves are provided for said coating on such side and means for preventing rotation of said cylindrical members during movement of the strip therebetween and for adjusting said cylindrical members to preselected points of contact of said fin members with said strip.

7. In the apparatus of claim 6, the cradle means comprising a pair of upright end plates each having an upwardly facing concave bearing surface thereon, the adjacent ends of said cylinder members resting freely on the bearing surface of the corresponding plate, said cylinder members thereby being biased toward one another by gravity.

8. A device for controlling the thickness of an adherent coating of paste material on a moving support strip comprising a pair of oppositely disposed cylindrical members having their axes parallel to one another and adapted to receive said strip therebetween, each said cylindrical member having a plurality of thin circular fin members disposed thereon at axially spaced positions, at least two fin members thereon being spaced together more closely than the other fin members, each cylindrical member being of reduced diameter between such fin members of closer spacing, and each said cylindrical member having at least one continuous portion of slightly greater diameter than said fin members, cradle means for supporting said cylindrical members with gravitational biasing thereof towards each other, said cradle means having an upwardly directed surface on which said members are freely moveable upon contact with said support strip, and means for preventing rotation of said cylindrical members in response to upward movement of the strip therebetween, said fin members on one of said cylindrical members being located in the same plane as the corresponding fin members on the other of said cylindrical members, and said fin members at their peripheries under said gravitational biasing contacting said strip, whereby thickness measuring grooves are provided for said coating, each said continuous portion acting to provide a coating-free area on said strip and said more closely spaced fin members acting to define an edge of said coating along said strip.

9. A device for controlling the thickness of adherent coatings of a nickel powder suspension in adhesive on opposite faces of a moving strip comprising means for applying the suspension as a coating to each face of the strip in excess of desired coating thickness, cradle means through which the suspension-coated strip passes, said cradle means having concave upwardly opening recessed surfaces, a pair of cylindrical body members supported freely on said surfaces respectively on opposite sides of said strip with their axes parallelly disposed, said body members being biased towards each other by gravity, and being non-rotative during passage therebetween of said moving strip, a plurality of thin circular sensing fin members positioned on said body members at spaced axial positions thereon and in planes perpendicular to the axes of said body members, the corresponding fin members of said respective body members being co-planar and adapted by gravitational action to contact and sense at the peripheries the opposite faces of said strip whereby suspension thickness measuring grooves for said coatings defined by said fin members and cylindrical body members are provided between adjacent fin members on each said cylindrical body member that effect removal of excess suspension and uniform selected thicknesses to the suspension coatings on the faces of the strip as it passes between the cylindrical body members.

10. A device for effecting uniformity of selected thicknesses of adherent coatings of a nickel powder suspension in adhesive on opposite faces of a moving strip comprising means for applying the suspension as a coating to each face of the strip with thicknesses in excess of the selected thicknesses, a pair of cylindrical body members between which the moving strip is passed after leaving said suspension applying means, said body members having their axes parallelly disposed, and being non-rotative during passage of the moving strip therebetween, cradle means having concave, upwardly opening recesses surfaces on which said cylindrical body members are supported freely and gravitationally biased toward each other, a plurality of thin sensing fin members positioned on each of said cylindrical body members at spaced-apart axial positions and in planes perpendicular to the axes of said cylindrical body members, with co-planar disposition of corresponding fin members of the respective cylindrical body members, said fin members under gravitational bias contacting and sensing at their peripheries the opposite faces of said moving strip passing between the said cylindrical body members and with their respective cylindrical body members defining selected thickness measuring grooves for the respective suspension coatings on opposite faces of said moving strip that remove excess of the applied suspension and effect uniform selected thicknesses of the suspensions adhered to the said faces as the strip passes between said cylindrical body members.

11. A device as per claim 10 in which said sensing fin members are eccentrically positioned on their respective cylindrical body members and in which means are provided for relatively adjusting the cylindrical body members to effect preselected points of contact between the fin members thereon and said strip and also to prevent rotation of said cylindrical body members after such selective adjustment has been effected.

References Cited by the Examiner
UNITED STATES PATENTS

| | | | |
|---|---|---|---|
| 422,609 | 3/1890 | McGraw et al. | 15—256.5 |
| 1,763,363 | 6/1930 | Moller | 118—120 |
| 2,088,949 | 2/1932 | Fekete | 117—217 X |
| 2,154,643 | 4/1939 | Steren et al. | 118—102 |
| 2,577,904 | 12/1951 | McNabb et al. | 118—115 X |
| 2,694,647 | 11/1954 | Cole | 117—22 |
| 2,759,850 | 8/1956 | Knopf | 117—114 |

RICHARD D. NEVIUS, *Primary Examiner.*

JOSEPH B. SPENCER, *Examiner.*

R. E. ZIMMERMAN, A. ROSENSTEIN,
*Assistant Examiners.*